US009935792B2

(12) United States Patent
Benninger

(10) Patent No.: US 9,935,792 B2
(45) Date of Patent: Apr. 3, 2018

(54) SYSTEM AND METHOD FOR SWITCHING BETWEEN CONVERSATIONS IN INSTANT MESSAGING APPLICATIONS

(75) Inventor: Bradley Benninger, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 959 days.

(21) Appl. No.: 12/391,447

(22) Filed: Feb. 24, 2009

(65) Prior Publication Data

US 2010/0217808 A1    Aug. 26, 2010

(51) Int. Cl.
*G06F 15/167* (2006.01)
*H04L 12/58* (2006.01)

(52) U.S. Cl.
CPC ............ *H04L 12/581* (2013.01); *H04L 51/04* (2013.01)

(58) Field of Classification Search
CPC ............................. H04L 51/04; H04L 21/581
USPC .................................. 709/206, 207; 715/758
See application file for complete search history.

(56) References Cited

U.S. PATENT DOCUMENTS

| | | | | |
|---|---|---|---|---|
| 6,121,968 | A * | 9/2000 | Arcuri et al. ................. | 715/825 |
| 6,212,548 | B1 * | 4/2001 | DeSimone et al. ........... | 709/204 |
| 6,630,944 | B1 * | 10/2003 | Kakuta et al. ................ | 715/758 |
| 7,120,455 | B1 * | 10/2006 | Chen et al. .................... | 455/466 |
| 7,328,242 | B1 | 2/2008 | McCarthy et al. | |
| 7,657,272 | B2 * | 2/2010 | Klassen et al. ............... | 455/466 |
| 7,769,144 | B2 * | 8/2010 | Yao et al. .................. | 379/88.13 |
| 2003/0177191 | A1 * | 9/2003 | Kawashima et al. ......... | 709/206 |
| 2005/0223066 | A1 * | 10/2005 | Buchheit et al. ............. | 709/206 |
| 2006/0064646 | A1 | 3/2006 | Kelso et al. | |
| 2006/0288107 | A1 * | 12/2006 | Klassen et al. ............... | 709/227 |
| 2007/0174407 | A1 * | 7/2007 | Chen et al. .................... | 709/207 |
| 2008/0055269 | A1 * | 3/2008 | Lemay et al. ................ | 345/173 |
| 2008/0092063 | A1 | 4/2008 | Canfield et al. | |
| 2008/0261569 | A1 | 10/2008 | Britt et al. | |
| 2008/0263157 | A1 * | 10/2008 | Bhogal et al. ................ | 709/206 |
| 2009/0177617 | A1 * | 7/2009 | Lee ................................ | 707/1 |
| 2009/0177981 | A1 * | 7/2009 | Christie et al. ............... | 715/758 |

OTHER PUBLICATIONS

Mykesoft, "Winsows Mobile: Textr." *Textr—Conversation based test messaging*. Published at least as early as Jul. 29, 2017. Geekzone. Feb. 3, 2009 <http://store.handango.com/ampp/store/PlatformProductDetail.jsp?siteId=1204&jid=3E6FA36147DE674D63X8299FF1X81667&platformId=2&productType=2&catalog=0&sectionId=0&productId=205866>.

(Continued)

*Primary Examiner* — Philip Chea
*Assistant Examiner* — Robert B McAdams
(74) *Attorney, Agent, or Firm* — Thomas Grzesik; Fleit Gibbons Gutman Bongini & Bianco P.L.

(57) ABSTRACT

A system and method are provided for switching between conversations in instant messaging applications. The instant messaging application is configured for displaying a list of conversations upon detecting selection of the option within a menu or link within the conversation screen and permit navigation to another conversation. The conversations may be prioritized based first on whether the conversation has any unread messages and within the grouping of those conversations having unread messages, may be prioritized based on when the last activity occurred. In this way, the user has easiest access to conversations with the most recent activity with the ability to scroll down the list of conversations to continue an older conversation if desired.

12 Claims, 12 Drawing Sheets

(56) References Cited

OTHER PUBLICATIONS

Microsoft, *Microsoft Office Communicator Mobile (2007 Release) User'Guide*(2007): pp. 18-35.
Hanson, Nate. "PDA Reviews and PDA News at pdaBuzz.com." *Review—SHAPE services IM+*. Publised at least as early as Jan. 24, 2006. pda Buzz. Feb. 6, 2009 <http://www.pdabuzz.com/Home/tabid/54/articleType/ArticleView/articleId/741/ReviewSHAPEServicesIM.aspx>.
Frey, Richard; Search Report from corresponding EP Application No. 09153529.4; completed Jul. 3. 2009.

\* cited by examiner

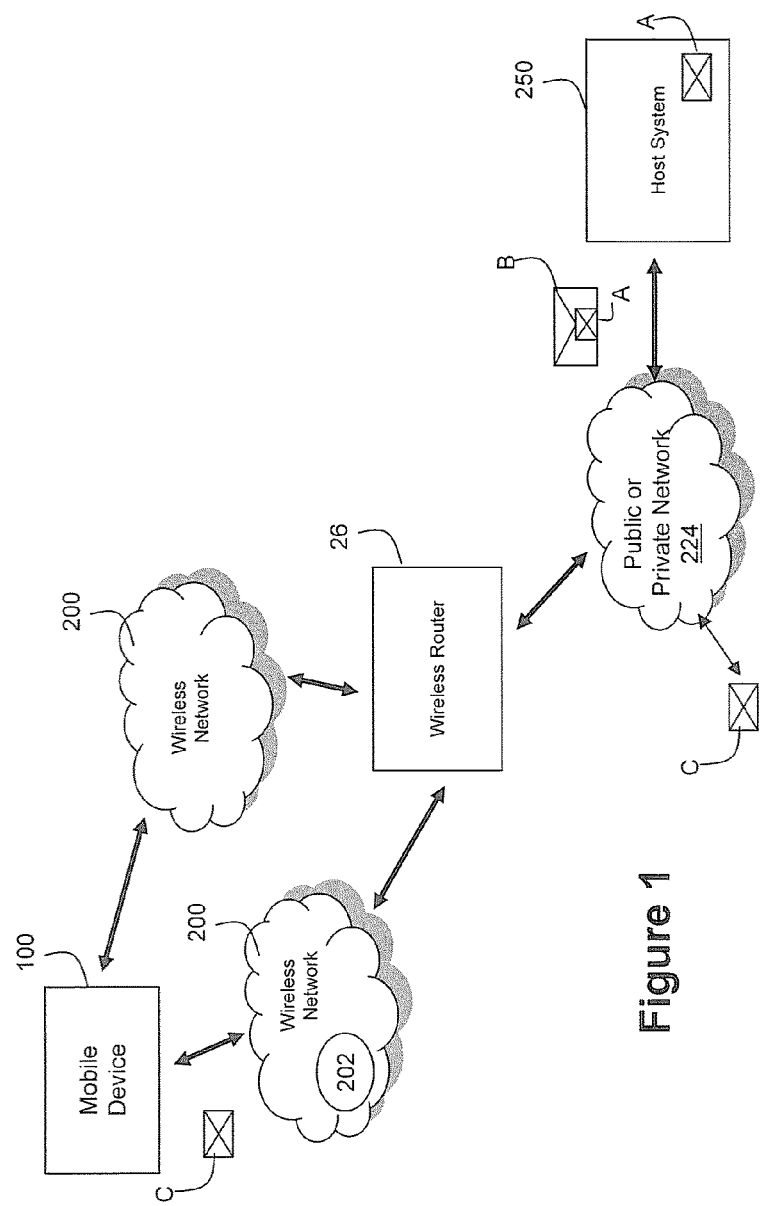

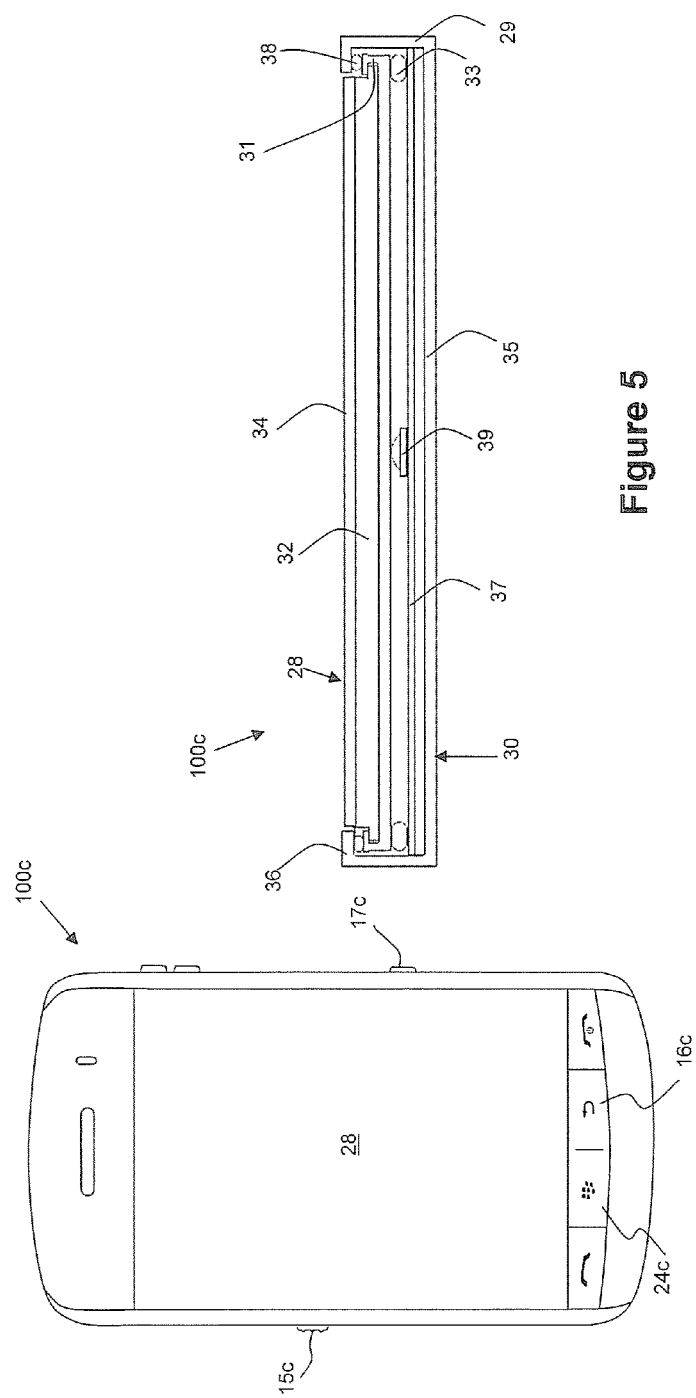

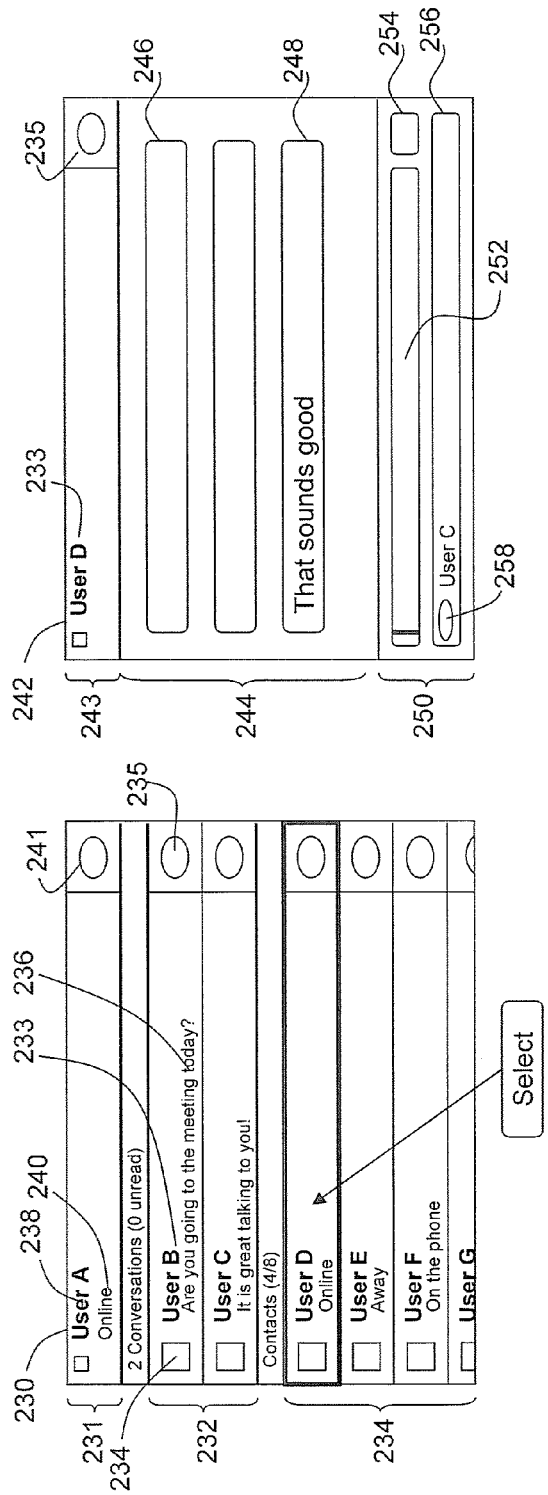

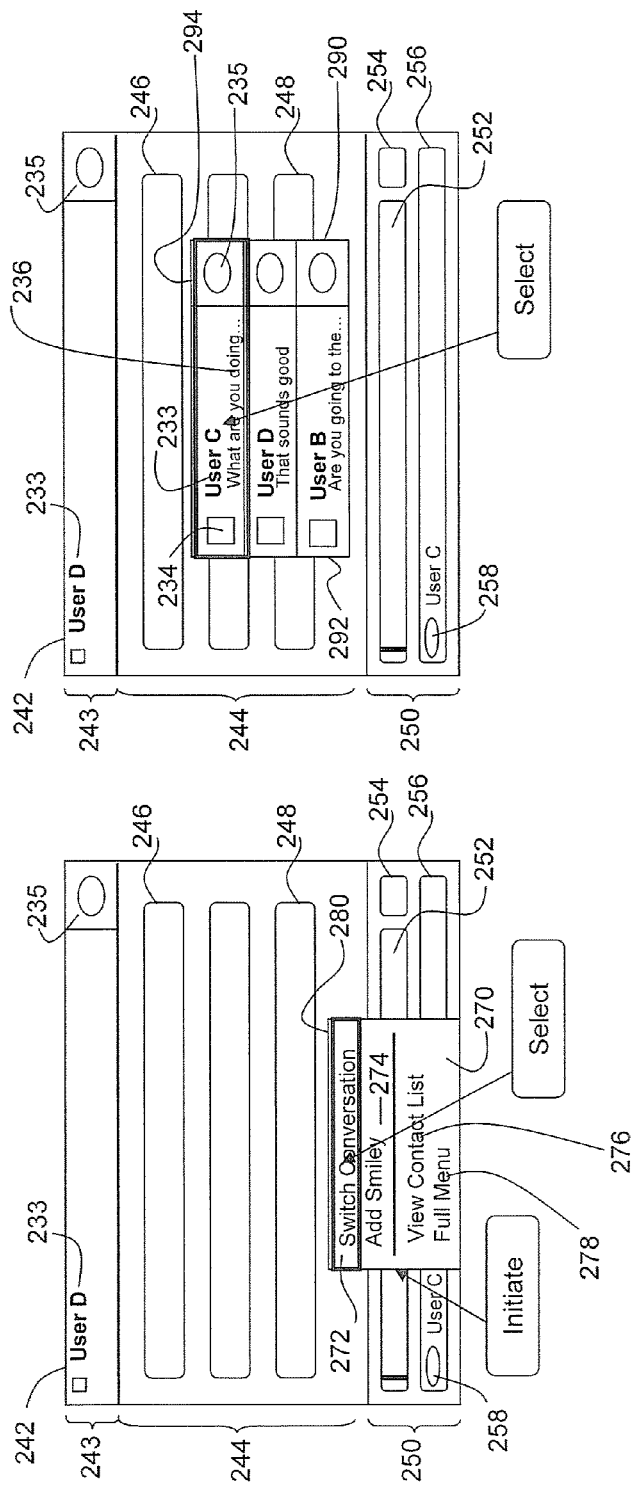

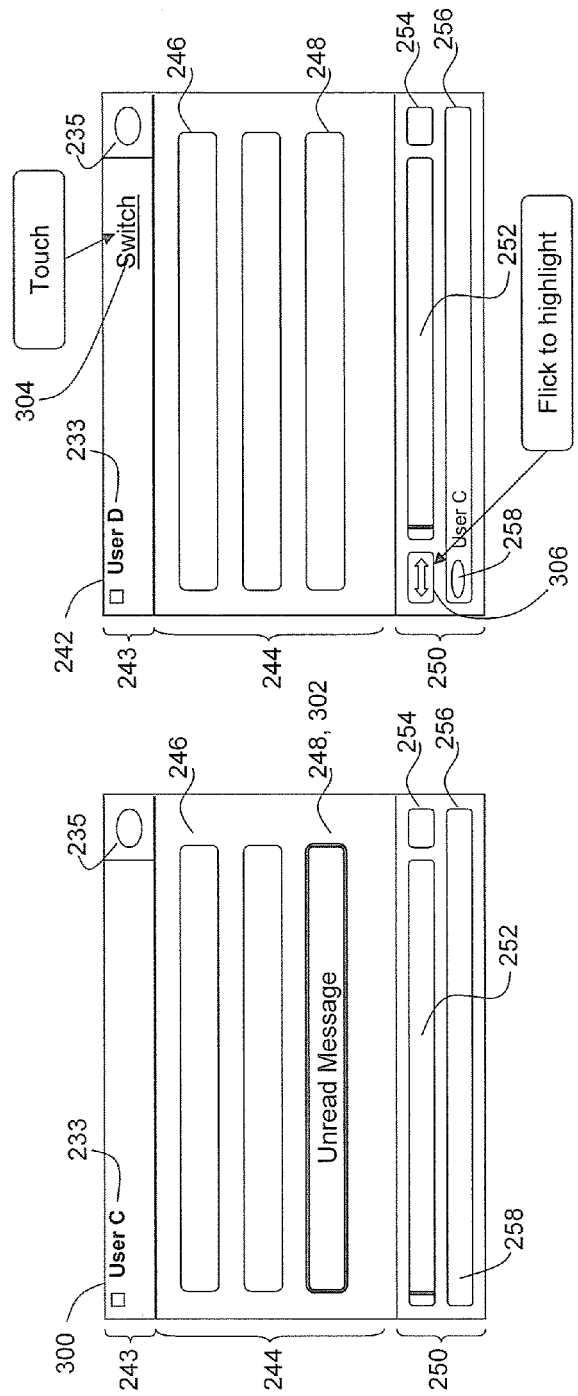

SYSTEM AND METHOD FOR SWITCHING BETWEEN CONVERSATIONS IN INSTANT MESSAGING APPLICATIONS

TECHNICAL FIELD

The following relates to switching between conversations in instant messaging applications.

DESCRIPTION OF THE RELATED ART

Instant messaging (IM) has become a convenient and popular way of communicating between users, whether using mobile devices, personal computers or both. An IM application typically allows a user to engage in multiple conversations, even across multiple IM platforms. Often, users wish to actively participate in such multiple conversations. However, this may require closing one conversation, returning to a list of conversations, and then opening another conversation, each time the user wishes to switch or navigate between conversations. This requires multiple steps than can be inconvenient and may increase the time it takes to respond to a message in any given conversation. Since an advantage of IM is the ability to rapidly and conveniently exchange messages, a reduction in responsiveness is typically considered a disadvantage to the user.

BRIEF DESCRIPTION OF THE DRAWINGS

Embodiments will now be described by way of example only with reference to the appended drawings wherein:

FIG. 1 is a system diagram illustrating the environment in which data items are pushed from a host system to a mobile device.

FIG. 4 is a schematic diagram of yet another mobile device and display screen therefor.

FIG. 5 is a cross-sectional view of the mobile device of FIG. 4.

FIG. 11 is a screen shot of an example user interface (UI) for an IM contacts screen for User A.

FIG. 12 is a screen shot of an example UI for an IM conversation screen comprising a conversation between User A and User D.

FIG. 14 is a screen shot of the UI shown in FIG. 11 while displaying a condensed menu of options pertaining to an IM conversation.

FIG. 15 is a screen shot of the UI shown in FIG. 11 while displaying a list of conversations which is displayed upon selection of the Switch Conversation option in the condensed menu shown in FIG. 14.

FIG. 16 is a screen shot of an example UI for an IM conversation screen comprising a conversation between User A and User C containing an unread message from User C.

FIG. 17 is a screen shot of an example UI for an IM conversation screen comprising a conversation between User A and User D while displaying exemplary links for initiating display of the list of conversations shown in FIG. 15.

DETAILED DESCRIPTION

Figure 3:
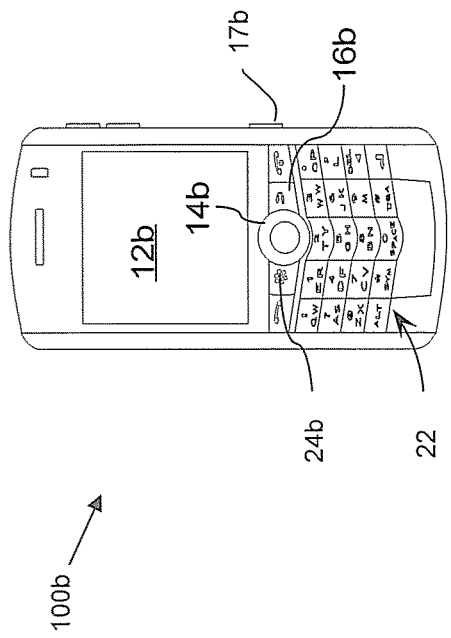
FIG. 3 is a schematic diagram of another mobile device and a display screen therefor.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

As discussed above, in order to switch between conversations, a user typically closes the current conversation screen, returns to a list of contacts and conversations, and opens another conversation screen. This requires multiple steps that can be inconvenient to the user, especially when frequent navigation between multiple active conversations is desired. To avoid such inconvenience, the instant messaging application can be configured to provide an option for displaying a list of conversations upon detecting selection of the option within a menu or link within the conversation screen and permit navigation to another conversation.

The conversations may be prioritized based first on whether the conversation has any unread messages and within the grouping of those conversations having unread messages, may be prioritized based on when the last message was sent or received. In this way, the user has easiest access to conversations with the most recent activity with the ability to scroll down the list of conversations to continue an older conversation if desired. This can be particularly advantageous upon detecting that a new conversation has arrived, e.g. upon observing a new incoming message. The user may then simply initiate display of the list of conversations as will be exemplified below, and at the top of the list will be the most recently received, unread message. This enables quick navigation into and out of various conversations facilitating continual participation in these various conversations, in particular to keep up with a conversation as new activity occurs.

Although the following examples are presented in the context of mobile communication devices, the principles may equally be applied to other devices such as applications running on personal computers and the like where appropriate.

For clarity in the discussion below, mobile communication devices will be commonly referred to as "mobile devices". Examples of applicable mobile devices include pagers, cellular phones, cellular smart-phones, wireless organizers, personal digital assistants, computers, laptops, handheld wireless communication devices, wirelessly enabled notebook computers and the like.

The mobile device may be a two-way communication device with advanced data communication capabilities including the capability of communicating with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device may be one that is used in a system that is configured for continuously routing all forms of pushed information from a host system to the mobile device. One example of such a system will now be described.

Referring now to the drawings, FIG. 1 is an example system diagram showing the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 1 represents an internal message sent from, e.g. a desktop computer within the host system 250, to any number of server computers in the corporate network 260 (e.g. LAN), which may, in general, include a database server, a calendar server, an E-mail server or a voice-mail server.

Message C in FIG. 1 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like Microsoft Exchange® Server or Lotus Notes® Server), all within and behind a corporate firewall.

The mobile device 100 may be adapted for communication within wireless network 200 via wireless links, as required by each wireless network 200 being used. As an illustrative example of the operation for a wireless router 26 shown in FIG. 1, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

By offering a wireless router 26 (sometimes referred to as a "relay"), there are a number of major advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channeled to mobile devices 100. For example an e-mail or message program 138 (see FIG. 6) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

As discussed above, a mobile device 100 may be a hand-held two-way wireless paging computer as exemplified in FIGS. 2-9, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations.

Figure 2:
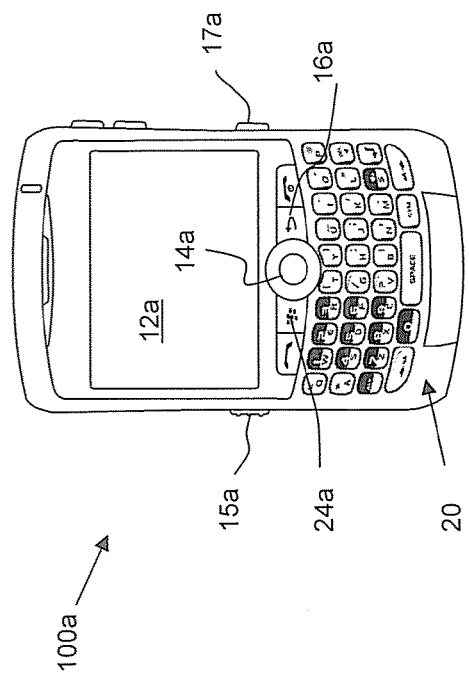
FIG. 2 is a schematic diagram of a mobile device and a display screen therefor.

Referring to FIGS. 2 through 5, one embodiment of a mobile device 100a is shown in FIG. 2, another embodiment of a mobile device 100b is shown in FIG. 3, and yet another embodiment of a mobile device 100c is shown in FIGS. 4 and 5. It will be appreciated that the numeral "100" will hereinafter refer to any mobile device 100, including the embodiments 100a, 100b and 100c, those embodiments enumerated above or otherwise. It will also be appreciated that a similar numbering convention may be used for other general features common between FIGS. 2 through 4 such as a display 12, a positioning device 14, a cancel or escape button 16, a camera button 17, and a menu or option button 24.

The mobile device 100a shown in FIG. 2 comprises a display 12a and the cursor or view positioning device 14 shown in this embodiment is a trackball 14a. Positioning device 14 may serve as another input member and is both rotational to provide selection inputs to the main processor 102 (see FIG. 6) and can also be pressed in a direction generally toward housing to provide another selection input to the processor 102. Trackball 14a permits multi-directional positioning of the selection cursor 18 (see FIG. 8) such that the selection cursor 18 can be moved in an upward direction, in a downward direction and, if desired and/or permitted, in any diagonal direction. The trackball 14a (and similar devices) can also be "flicked" in order to provide a distinguishable input from a normal scroll, e.g. a sideways flick. The trackball 14a is in this example situated on the front face of a housing for mobile device 100a as shown in FIG. 2 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 2 also comprises a programmable convenience button 15a to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15a and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 3 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 3, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

Referring to FIGS. 4 and 5, the mobile device 100c is shown comprising a touch-sensitive display, also commonly referred to as a "touchscreen". In FIG. 4, the touch sensitive display 28 allows a user to interact with the mobile device 100c. In this embodiment, the mobile device 100c also comprises a menu or option button 24c and a cancel or escape button 16c. In this example, a convenience button 15c and camera button 17c are disposed on the sides of the housing.

As best shown in FIG. 5, the housing 30 of the mobile device 100c includes a back 35, a frame 36, which surrounds the touch-sensitive display 28, sidewalls 29 that extend between and generally perpendicular to the back 35 and the frame 36, and a base 37 that is spaced from and generally parallel to the back 35. The base 37 can be any suitable base and can include, for example, a printed circuit board or flex circuit board. The back 35 includes a plate (not shown) that is releasably attached for insertion and removal of, for example, a battery and a SIM/RUIM/USIM card 126 (see FIG. 6). It will be appreciated that the back 35, the sidewalls 29 and the frame 36 can be injection molded, for example. In the exemplary mobile device 100c shown in FIG. 4, the frame 36 is generally rectangular with rounded corners although other shapes are possible.

The display device 32 and the overlay 34 can be supported on a support tray 31 of suitable material such as magnesium for providing mechanical support to the display device 32 and overlay 34. The display device 32 and overlay 34 are biased away from the base 37, toward the frame 36 by biasing elements 33 such as gel pads between the support tray 31 and the base 37. Compliant spacers 38, which can also be in the form of gel pads for example, are located between an upper portion of the support tray 31 and the frame 36. The touch screen display 28 is moveable within the housing 30 as the touch screen display 28 can be moved toward the base 37, thereby compressing the biasing elements 33. The touch screen display 28 can also be pivoted within the housing 30 with one side of the touch screen display 28 moving toward the base 37, thereby compressing the biasing elements 33 on the same side of the touch screen display 28 that moves toward the base 37.

In the present example, the switch 39 is supported on one side of the base 37 which can be printed circuit board while the opposing side provides mechanical support and electrical connection for other components (not shown) of the mobile device 100*c*. The switch 39 can be located between the base 37 and the support tray 31. The switch 39, which can be a mechanical dome-type switch, for example, can be located in any suitable position such that displacement of the touch screen display 28 resulting from a user pressing the touch screen display 28 with sufficient force to overcome the bias and to overcome the actuation force for the switch 39, depresses and actuates the switch 39. In the present embodiment the switch 39 is in contact with the support tray 31. Thus, depression of the touch screen display 28 by user application of a force thereto, causes actuation of the switch 39, thereby providing the user with a positive tactile quality during user interaction with the user interface of the portable electronic device 20. The switch 39 is not actuated in the rest position shown in FIG. 5, absent applied force by the user. It will be appreciated that the switch 39 can be actuated by pressing anywhere on the touch screen display 28 to cause movement of the touch screen display 28 in the form of movement parallel with the base 37 or pivoting of one side of the touch screen display 28 toward the base 37. The switch 39 is connected to a processor (e.g. main processor 102) and can be used for further input to the processor when actuated. Although a single switch is shown any suitable number of switches can be used and can be located in any suitable position.

The touch screen display 28 can be any suitable touch screen display such as a capacitive touch screen display. A capacitive touch screen display 28 includes the display 32 and the touch-sensitive overlay 34, in the form of a capacitive touch-sensitive overlay 34. It will be appreciated that the capacitive touch-sensitive overlay 34 includes a number of layers in a stack and is fixed to the display 32 via a suitable optically clear adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch screen display 28 can be determined. For example, the size and the shape of the touch on the touch screen display 28 can be determined in addition to the location (X and Y values) based on the signals received at the controller 36 from the touch sensor layers.

As will be appreciated, a controller interprets touch events detected on the touch screen display 28, and controls the portable electronic device 20 accordingly. As used herein, a touch event can be, for example, a single touch, a combination of touches, such as a "double touch", a "touch and hold", a "touch and drag", or a touch made with sufficient force to depress the switch 39 described above. The interpretation of a given touch event will depend on the software and implementation details used by the portable electronic device 20. According to an embodiment, an activation touch event, also referred to as a "click" touch event or "clicking", is a touch event where sufficient force is applied to the touch screen 38 to depress or activate the switch 39, and to provide tactile feedback to the user. Such an activation touch event invokes an action as determined by the underlying application and as displayed to the user in a graphical user interface (GUI). As used herein, a user selection is made by such an activation touch event. According to an embodiment, a highlighting touch event, also referred to as a "focus" touch event, is a touch event where the touch screen display 28 is touched lightly without sufficient force to activate the switch 38, and causes the item so touched to be highlighted, or otherwise visibly selected, for further action.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 2 through 5 are for illustrative purposes only and various other mobile devices 100 are equally applicable to the following examples. Other buttons may also be disposed on the mobile device housing such as colour coded "Answer" and "Ignore" buttons to be used in telephonic communications. Furthermore, the housing for the mobile device 100 should not be limited to the single-piece configurations shown in FIGS. 2 through 5, other configurations such as clamshell or "flip-phone" configurations are also applicable.

To aid the reader in understanding the structure of the mobile device 100 and how it communicates with the wireless network 200, reference will now be made to FIGS. 6 through 9.

Figure 6:
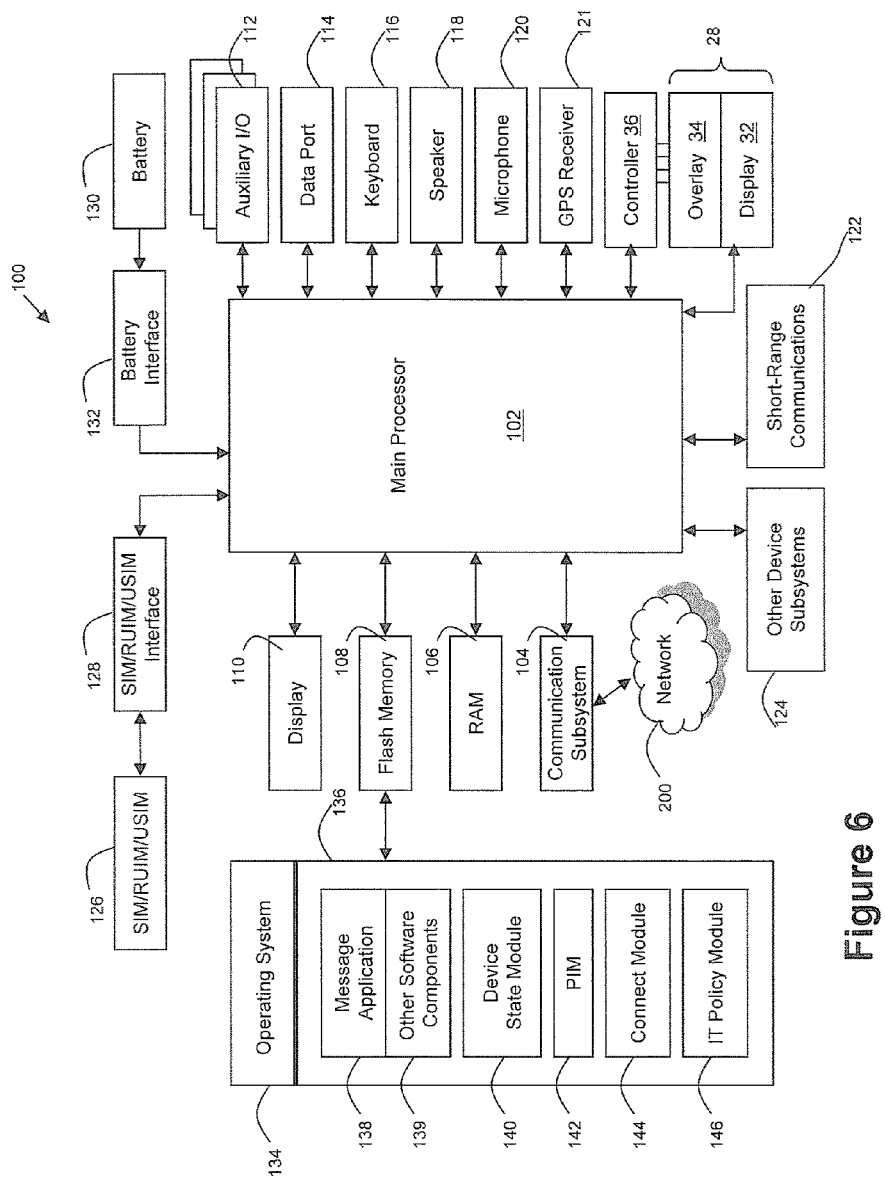
FIG. 6 is a block diagram of an exemplary embodiment of a mobile device.

Referring first to FIG. 6, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a the touch-sensitive overlay 34 on the display 32 that are part of the touch screen display 28, in addition to possibly the auxiliary I/O subsystem 122. The auxiliary I/O subsystem 112 may include devices such as: a mouse, track ball, infrared fingerprint detector, or a roller wheel with dynamic button pressing capability. A composed item may be transmitted over the wireless network 200 through the communication subsystem 104.

Figure 7:
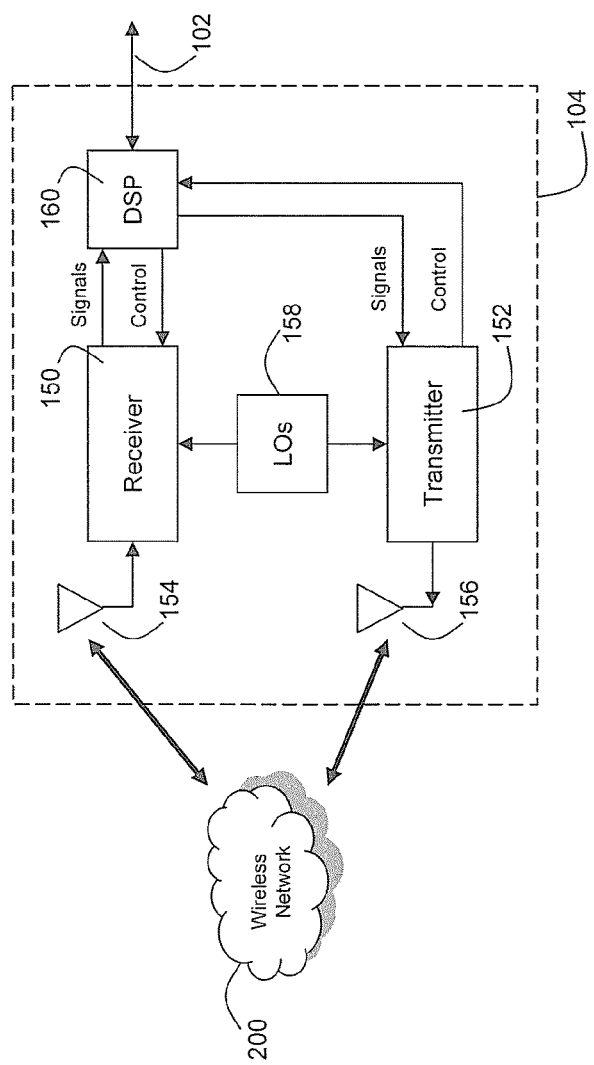
FIG. 7 is a block diagram of an exemplary embodiment of a communication subsystem component of the mobile device of FIG. 6.

Referring now to FIG. 7, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 5 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 may be periodically turned off to conserve power until it is needed to receive signals or information (if at all) during designated time periods.

Figure 8:
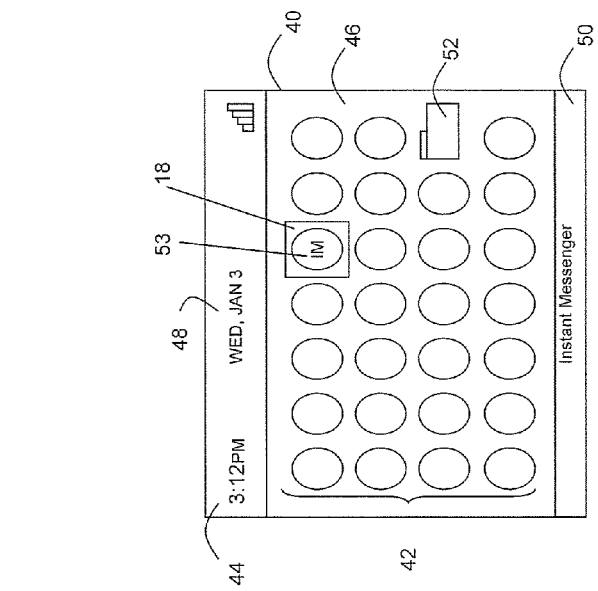
FIG. 8 is a screen shot of a home screen displayed by the mobile device.

Turning now to FIG. 8, the mobile device 100 may display a home screen 40, which may be the active screen when the mobile device 100 is powered up or may be accessible from other screens. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 8 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as an IM application 54 (see also FIG. 9) may be initiated (opened or viewed) from display 12 by highlighting a corresponding icon 53 using the positioning device 14 and providing a suitable user input to the mobile device 100. For example, IM application 54 may be initiated by moving the positioning device 14 such that the icon 53 is highlighted by the selection box 18 as shown in FIG. 8, and providing a selection input, e.g. by pressing the trackball 14*b*. Alternatively, in a mobile device 100*c* such as in FIGS. 4 and 5, an application may be initiated (opened or viewed) from a touch screen display 28 by executing a "click" touch event or "clicking" the touch screen display 28 at the X and Y position of the corresponding icon 53.

Figure 9:
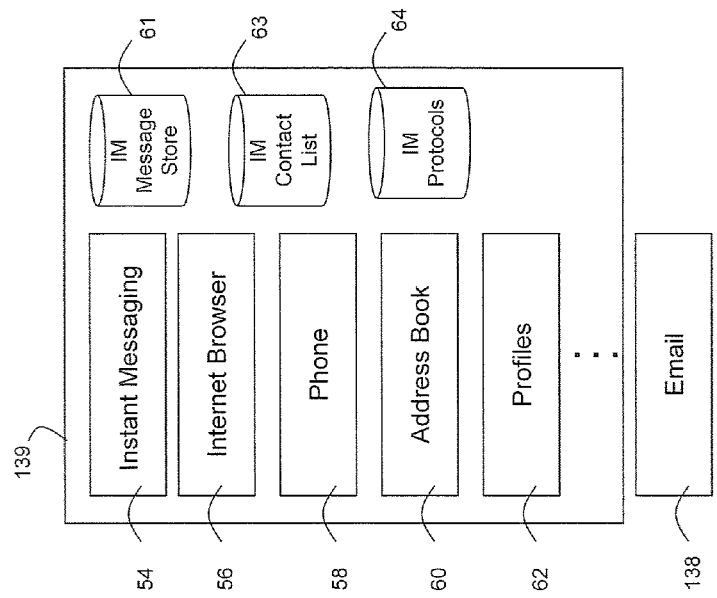
FIG. 9 is a block diagram illustrating exemplary ones of the other software applications and components shown in FIG. 6.

FIG. 9 shows an example of the other software applications and components 139 that may be stored on and used with the mobile device 100. Only examples are shown in FIG. 9 and such examples are not to be considered exhaustive. In this example, an IM application 54, internet browser 56, phone application 58, address book 60 and a profiles application 62 are shown to illustrate the various features that may be provided by the mobile device 100. Also shown in FIG. 9 is the message application 138, which in the following will be referred to as an email application 138 for clarity. It will be appreciated that the various applications may operate independently or may utilize features of other applications. For example, the phone application 62 and email application 138 may use the address book 60 for contact details. IM application 54 may be implemented as a PIN-to-PIN system (where PIN refers to a personal identification number) or may be a locally installed application for use with a $3^{rd}$ party system, details of which are described below and shown in FIG. 8. As such, it can be appreciated that the mobile device 100 may facilitate the use of multiple IM clients operated by respective systems and the IM application 54 generally represents any one or more IM protocols and platforms stored on and available to the user of the mobile device 100.

IM application 54 comprises or otherwise has access to an IM message store 61, which is used to store instant messages and IM sessions or conversations, for the IM application 54, each comprising one or more messages exchanged with a particular correspondent or buddy. The IM application 54 also comprises or otherwise has access to an IM contact list 63, which may or may not be a subset of the contacts in the address book 60. The IM Contact List 63 comprises the buddies with which the user of the mobile device 100 can engage in an instant messaging conversation, using the system associated with the IM application 54. The IM application 54 also comprises or otherwise has access to a database or other memory structure for IM protocols 64, which may be included where multiple IM protocols are utilized, either through different interfaces or through a unified interface. The IM protocols 64 are used to keep track of presence information and provides the ability for the IM application 54 to handle incoming and outgoing messages with contacts associated with different IM platforms.

Figure 10:
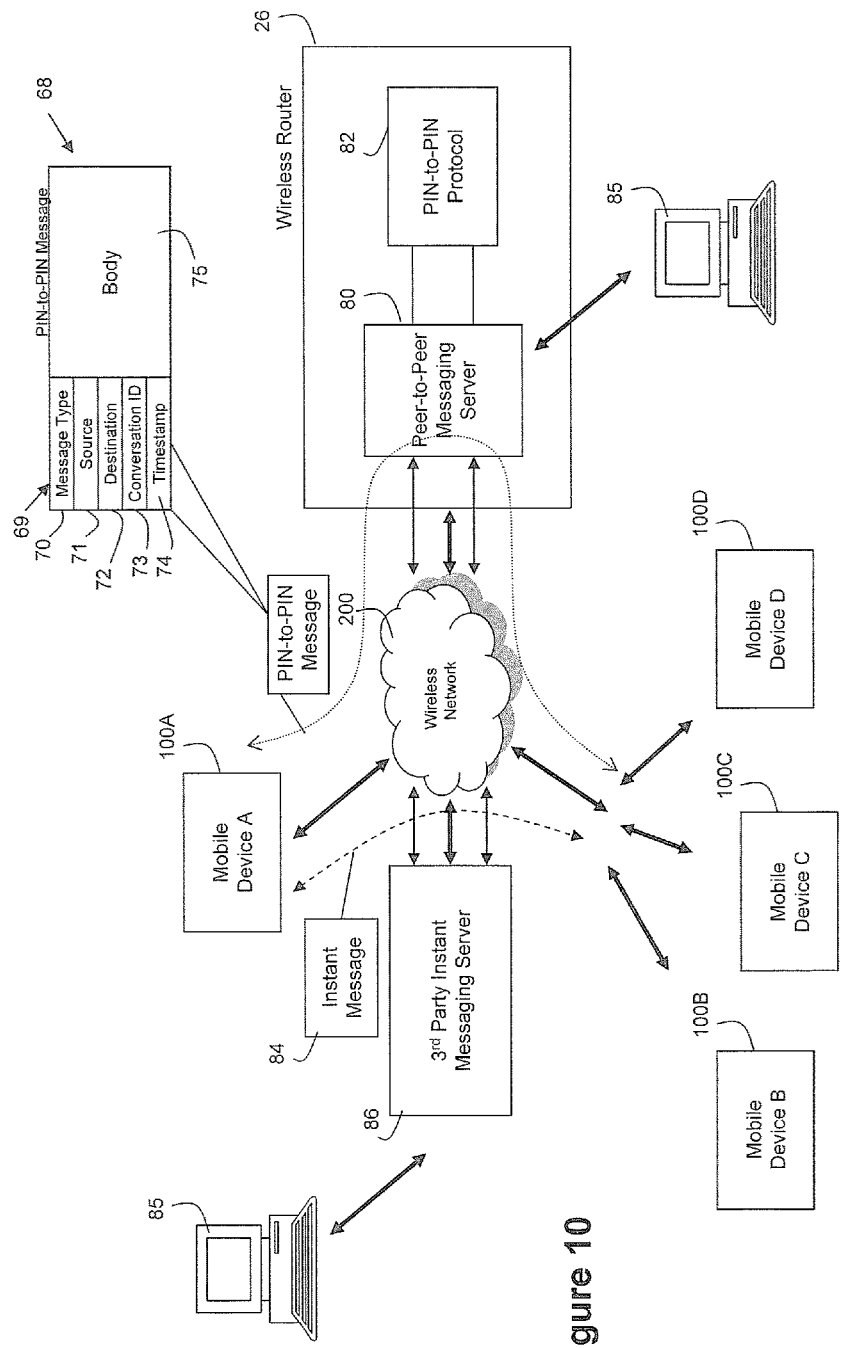
FIG. 10 is a system diagram showing one configuration for instant messaging (IM) on multiple platforms.

Turning now to FIG. 10, a configuration suitable for a user of mobile device A, hereafter referred to as mobile device 100A, to participate in instant messaging with buddies included in their IM contact list 63 is shown. It can be seen in FIG. 10 that two examples of instant messaging systems are shown. A PIN-based messaging system is shown that utilizes the wireless router 26 and a 3 party IM service is also shown that utilizes a $3^{rd}$ party IM server 86 accessed by mobile device 100A through the network 200. As can be seen, the $3^{rd}$ party IM server 86 may also communicate with desktop users 85 thus facilitating instant messaging between desktop users 85 and between a mobile device user 100 and a desktop user 85. Similarly, the PIN-based messaging system may also facilitate communications with desktop users 85.

In the embodiment illustrated in FIG. 10, the PIN-based messaging system is implemented using a server-based communication infrastructure, such as one that provides email, SMS, voice, Internet and other communications. Particularly suitable for hosting a peer-to-peer messaging server 80, is the wireless router 26 used in systems such as those shown in FIG. 1. In FIG. 10, the wireless router 26 facilitates communications such as instant messaging between mobile device 100A and mobile devices for User B, User C and User D, denoted by 100B, 100C and 100D respectively. It will be appreciated that the number of users participating in the example shown in FIG. 10 is for illustrative purposes only. Instant messaging is provided by the instant messaging program 54 stored on each mobile device 100A-100D which is initiated from the home screen 40 by highlighting and selecting the IM icon 53 as illustrated in FIG. 8. The wireless router 26 routes messages between the mobile devices 100A-100D according to a PIN-to-PIN protocol 82.

A PIN-to-PIN based instant message is generally denoted by numeral 68 in FIG. 10. In this embodiment, the message 68 is a PIN-based message. In a PIN-based messaging protocol 82, each message 68 has associated therewith a PIN corresponding to the mobile device 100 which has sent the message 68 (source) and includes a destination PIN identifying the intended recipient (destination). Further detail of an example structure for the messages 68 is also shown in FIG. 10. Each message 68 generally comprises a body 75, which contains the content for the message 68 (e.g. text), and a header 69, which contains various fields used for transmitting and processing each message 68. In this example, the header 69 includes a message type field 70 to specify the type of transmission (e.g. PIN, SMS etc.), a source field 71 to specify the device address for the sender, a destination field 72 to specify the device address for the intended recipient, a conversation ID field 73 to identify which conversation thread the message 68 corresponds to (e.g. such that each message 68 is identified by the conversation in which it was sent), and a timestamp field 74 to indicate the time (and if desired, the date) at which the message 68 was sent by the designated sender.

It will be appreciated that other information or attributes may be included in the message 68, such as a subject field (not shown) to enable a subject for part or all of the conversation to be transported with the message 68 (e.g. to create new subjects, modify subjects, notify others of subjects, etc.). Although not shown in FIG. 10, one or more tags can also be used to indicate to the IM application 54, upon receipt of a message 68, that the message 68 has certain attributes such as a subject that is to be displayed, whether additional information is being transported (i.e. data or information in addition to the message content), or whether the message 68 is being used for some other purpose such as provisioning, synchronization, etc.

In general, in a PIN based messaging protocol 82, the sender of the message 68 knows the PIN of the intended recipient. This is preferably established when the two devices request to add each other to their respective contact or buddy lists. At the time of requesting new contacts, in traditional PIN-to-PIN protocols 82, the two respective PIN numbers may be exchanged via request e-mails which are configured to be intercepted by respective IM applications 54 so as to not appear in the message list or "inbox" of the user. In other embodiments, to avoid the exchange of email messages to add a buddy to the IM contact list 63, a global address list (GAL) application (at the host system 250—not shown) may instead be accessed in order to obtain the PIN for the intended recipient directly. Alternatively, the user may simply ask for the PIN from another user and enter it manually.

In the example shown in FIG. 10, mobile device 100A can communicate directly with any of the mobile devices 100B-100D through the peer-to-peer messaging server 80 as indicated by the short-dashed line. Instant messaging can also be accomplished through the $3^{rd}$ party IM server 86 by sending $3^{rd}$ party based instant messages 84 over the wireless network 200 as indicated by the long-dashed line.

When conducting a PIN-to-PIN instant messaging session according to the embodiment shown in FIG. 10, the mobile devices 100A-100D can communicate directly with the wireless router 26 in a client based exchange where, similar to other peer-to-peer programs, an intermediate server is not required. A message 68 sent by one mobile device 100 is received by the wireless router 26, which obtains the PIN number for the intended recipient from information associated with the message 324 (e.g. a data log) or from the message 324 itself. Upon obtaining the recipient's PIN according to the PIN-to-PIN protocol 82, the wireless router 26 then routes the message 68 to the recipient associated with the mobile device 100 having such a PIN. The wireless router 26 typically also provides a delivery confirmation to the original sender, which may or may not be displayed to the user. The destination device can also provide such delivery information. The wireless router 26 should be capable of routing messages 68 reliably and hold onto the messages 68 until they are successfully delivered. Alternatively, if delivery cannot be made after a certain timeout period, the wireless router 26 may provide a response indicating a failed delivery. The wireless router 26 may choose to expire a message 68 if a certain waiting period lapses.

It will also be appreciated that, as noted above, instant messaging can be implemented using any other suitable protocol such as SMS. In SMS, a message is transmitted to an SMC center (SMSC) within a carrier's infrastructure, and then delivered to the mobile phone number of the destination device. The SMSC would also be configured to hold onto messages and deliver then once the destination device is within coverage.

When conducting an instant messaging session using a $3^{rd}$ party IM application, access to the $3^{rd}$ party instant messaging server 86 is first established and instant messages 84 exchanged over the wireless network 200 according to the appropriate protocol used by the $3^{rd}$ party. It will be appreciated that the principles discussed below are equally applicable to both PIN-to-PIN messaging and other Internet service-based instant messaging systems hosted by such $3^{rd}$ parties.

FIG. 11 shows an example user interface (UI) for a contacts screen 230 provided by the IM application 54, displayed for User A. The contacts screen 230 in this example organizes contacts or "buddies" into separate lists, a first list 232 of current or active or open conversations, and a second list 234 of all contacts, the lists being distinguished according to the status of User A's contacts. In this example, User A has current conversations pending with Users B and C, as shown in the first list 232; and four of eight contacts are available to User A at this time, as shown in the second list 234. For each contact listed in the contacts screen 230, a name 233 and emoticon 234 or other icon may be displayed in the appropriate list according to the current status or presence of that contact. Each contact listing may also comprise the most recent message 236 in the conversation history to identify the nature of the conversation, as well as the avatar 235 or other distinguishable icon or representation of the contact. The contacts screen 230 also comprises a contacts list header 231 comprising a name 238, tagline 240, and avatar 241 (similar to each contact listing) for the user associated with the contacts screen 230, in this example User A. The tagline 240 comprises user-definable text, e.g. a message regarding what the user is currently doing, an announcement they wish to share, etc.

User A may continue a current conversation (e.g. with User B or User C) by highlighting and selecting the corresponding contact listing in the first list 232. User A may also begin a new conversation by highlighting and selecting the appropriate contact listing in the second list 234. New conversations can also be initiated with a contact having an existing conversation (i.e. multiple conversations with the same contact). As shown in FIG. 11, User A may begin a new conversation with User D by selecting User D's contact listing, which the IM application 54 detects and initiates a conversation screen 242 with User D, the UI for which is shown in FIG. 12.

The conversation screen 242 comprises a message history portion 244, which lists the messages exchanged in the conversation with, in this example, User D. In this example, the messages are added to the bottom of the history, the most recent message being denoted by numeral 248 in FIG. 12. The conversation screen 242 also comprises a message entry and status portion 250. The message entry and status portion 250 comprises a message entry box 252 to enable User A to type a message, and a notification bar 256 for notifying User A of new messages as they arrive and who they are from. A status icon 258 may also be provided with a new notification to indicate the status or presence of the user sending the new message. Also shown in FIG. 12 is an emoticon link 254, which can be used to add emoticons into the message being composed. The conversation screen 242 also comprises a conversation header 243, which comprises the name 233 and avatar 235 for the recipient, User D in this example.

Figure 13:
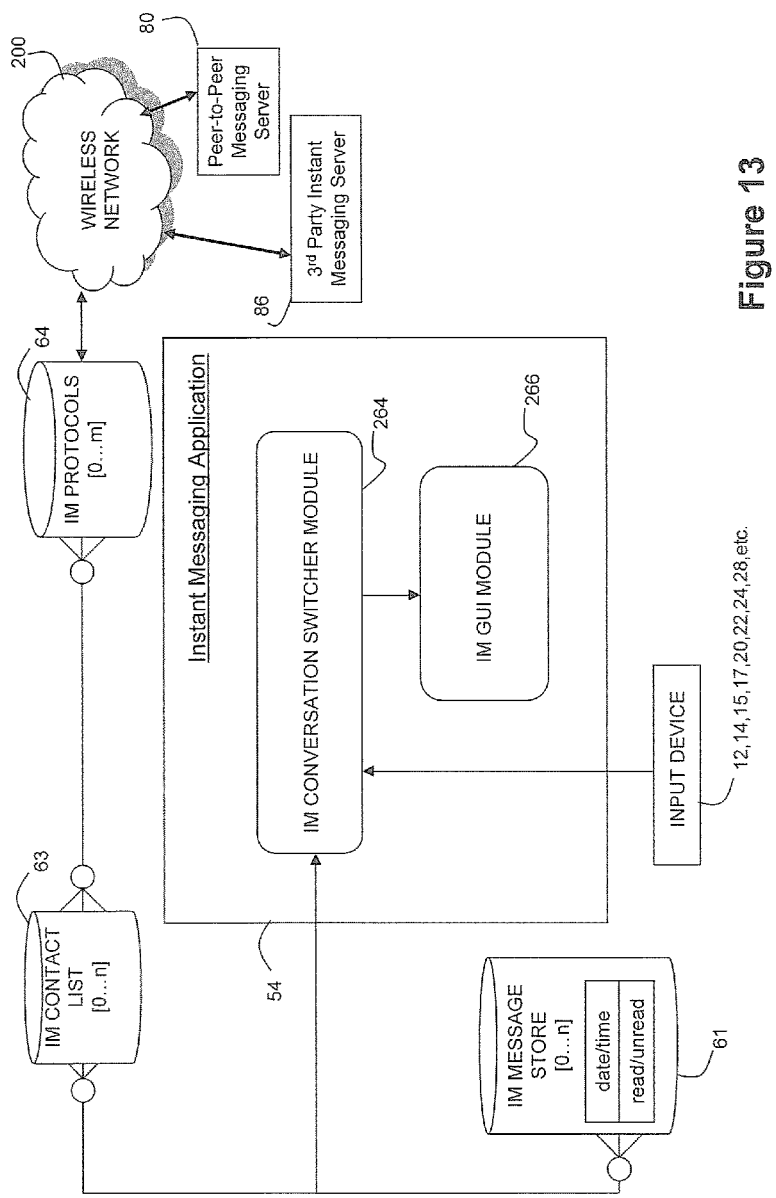
FIG. 13 is a block diagram illustrating functional modules utilized by the IM application for switching between conversations.

As discussed above, in order to switch between conversations, a user typically closes the current conversation screen 242, returns to the contacts screen 230, and opens another conversation screen 242. This requires multiple steps that can be inconvenient to the user, especially when frequent navigation between multiple active conversations is desired. To avoid such inconvenience, the IM application 54 can be configured or otherwise programmed to display a list of conversations upon detecting selection of an option via a menu item or link within the conversation screen 242. FIG. 13 provides a block diagram illustrating one embodiment for implementing an IM conversation switcher module 264 for the IM application 54. The conversation switcher module 264 is able to monitor and access data pertaining to the conversations stored in the IM message store 61 and IM contact list 63, which can communicate via the various IM protocols 64 (if applicable). The coordination of the conversation switcher module 264 with the IM message store 61, IM contact list 63 and IM protocols 64, facilitates the participation in instant messaging using multiple IM platforms (e.g. see also FIG. 10). The data pertaining to the conversations is used to determine which conversations should be listed and in what order. Based on such determinations, the conversation switcher module 264 provides data to an IM GUI module 266 for displaying a list of conversations available to the user and subsequently displaying another conversation selected by the user.

The conversation switcher module 264 may access the IM message store 61 to determine the date and time and the read vs. unread status of messages in each conversation for determining the order in which to display the conversations the user may navigate to. As discussed above, the conversation switcher module 264 prioritizes the conversations based first on whether the conversation has any unread messages to create a first group of conversations and within this first group of conversations having unread messages, prioritizes based on when the last activity occurred. A second group of conversations having no unread messages can also be created and those conversations within the second group are also prioritized based on when the last activity occurred. In this way, the user has easiest and most immediate access to conversations with the most recent activity (with unread messages having highest priority) with the ability to scroll down the list of conversations to locate and initiate a relatively "older" conversation if desired. This can be particularly advantageous upon detecting that a new conversation has arrived, e.g. by observing a message in the notification bar 256. The user may then simply initiate the display of a list of conversations as will be exemplified below, and at the top of the list will be the most recently received unread message. This enables quick navigation into and out of various conversations facilitating participation in these various conversations, in particular to keep up with a conversation as new activity occurs.

As noted, in order to initiate the conversation list to facilitate switching between conversations, the conversation switcher module 264 detects one or more inputs provided through certain input devices, such as those indicated in FIG. 13. Upon detecting a first input to select an option for switching between conversations, the conversation switcher module 264 may then determine the conversation hierarchy by either determining this in real time or referring to data that is periodically updated, and display the list of conversations. The way in which the list of conversations is initiated is typically dependent on the input devices available. In some embodiments, an option for loading the list is provided in a menu initiated by the user, and in other embodiments, options may be provided directly in the conversation screen 242 via a link, i.e. to enable the list of conversations to be displayed without the need to first access a menu.

Turning now to FIG. 14, a condensed menu 270 is shown, which can be initiated by the user using an appropriate input device, e.g. pressing the trackball 14*a*, 14*b* or selecting a menu or option button 24. The condensed menu 270 can also be initiated and displayed by detecting selection of a convenience key 15. The condensed menu 270 in this example provides quick access to a selected list of options, including a Switch Conversation option 272, an Add Smiley option 274, a View Contact List option 276, and a Full Menu option 278. The Add Smiley option 274 is similar to the emoticon link 254 and allows the user to insert a smiley face emoticon into the message being composed. The View Contact List option 276 provides a shortcut to navigate to the contacts screen 230, and the Full Menu option 278 enables a more complete menu (not shown) with a greater number of options to be displayed. The Switch Conversation option 272, when selected (e.g. by highlighting the Switch Conversation option 272 using a selection bar 280 and pressing the trackball 14*a*, 14*b*), initiates a determination by the IM conversation switcher module 264 of the hierarchy of conversations, and the display of the user's conversations, according to the hierarchy discussed above and shown in FIG. 15.

A list of conversations 290 is shown in FIG. 15 and comprises, in this example, a pop-up window or selection box which contains a conversation listing 292 for each conversation in which User A is/has engaged, according to a particular hierarchy. The hierarchy can be predetermined or set according to user preferences. In this example, the hierarchy is predetermined to place priority on unread messages and if more than one conversation has an unread message, a first group of conversations having unread messages are listed in the order of most recent activity. Following this first group of conversations may then be a second group of other conversations that do not have an unread message, which would be listed within the second group in order based on most recent activity. This allows the most current activity to be quickly accessed but also provides a way to access and switch into any conversation, e.g. by scrolling through the list of conversations 290. It can be seen in FIG. 15 that since a message has just arrived from User C and has not yet been read, a conversation listing 292 for User C is placed first in the list of conversations 290, followed by a conversation listing 292 for User D which would have more recent activity than the conversation with User B since the list of conversations 290 is being displayed within the conversation screen 242 associated with User D. It may be noted however that if the list of conversations 290 is initiated before any messages are sent or received in the conversation with User D, the most recent activity for those conversations with no unread messages may be a different conversation such as the conversation with User B.

By highlighting the conversation listing 292 for User C using a selection bar 294 provided in the list of conversations 290, and selecting the conversation listing 292, e.g. by pressing the trackball 14*a*, 14*b*; User A is navigated from the conversation with User D to the conversation with User C, in which there is an unread message 302, also being the most recent message 248 shown in FIG. 16. FIGS. 14 to 16 illustrate that a condensed menu 270 can be initiated from directly within the conversation screen 242, a Switch Conversation option 272 then provided and, upon selecting the Switch Conversation option 272, a list of conversations 290 displayed directly within the conversation screen 242 to provide quick access to various conversations listings 292 arranged in an order dictated by a hierarchy. The hierarchy in this example puts priority on unread messages first and then on most recent activity.

In some embodiments, accessing a menu in order to initiate the conversation list 292 can be avoided by providing a link directly in the conversation screen 242, which can be selected using a suitable input mechanism to then immediately display the list of conversations 290. FIG. 17 provides two such examples, although it will be appreciated than only one link would typically be used. In one embodiment, the link is comprised of a conversation switch button 306, in this example placed to the left of the message entry box 252. By placing the conversation switch button 306 close to the message entry box 252, an input mechanism such as the trackball 14*a*, 14*b* may be translated or "flicked" in a horizontal direction, i.e. towards the button 306. This would highlight the switch button 306 and pressing the trackball 14*a*, 14*b* or an equivalent selection mechanism would cause the list of conversations 290 to be immediately displayed as shown in FIG. 15. In this example, the trackball 14*a*, 14*b* would be free to scroll vertically within the conversation screen 242, e.g. to highlight the message notification 256 but a horizontal flick or scroll towards the switch button 306 would place focus on the switch button 306 to facilitate access to the list of conversations 290 while distinguishing such an input from normal scrolling of the trackball 14*a*, 14*b*. The switch button 306 can also be located on other parts of the conversation screen 242, however, to minimize scrolling required to highlight the switch button 306, it should be placed close to the message entry box 252 which is typically the most used portion of the conversation screen 242.

When other input mechanisms are available, e.g. if a touchscreen 28 is employed as shown in FIGS. 4 and 5, the link may be placed anywhere within the conversation window 242 since that location only needs to be touched by the user to highlight the link. In another embodiment, also shown in FIG. 17, a hyperlink style switch link 304 is placed in the conversation header 243 and when the conversation switcher module 264 detects a touch event at that location, causes the list of conversations 290 to be immediately displayed as shown in FIG. 15. It can be appreciated that such touch events can be effected using a finger, stylus or other similar device.

Figures 18, 19:
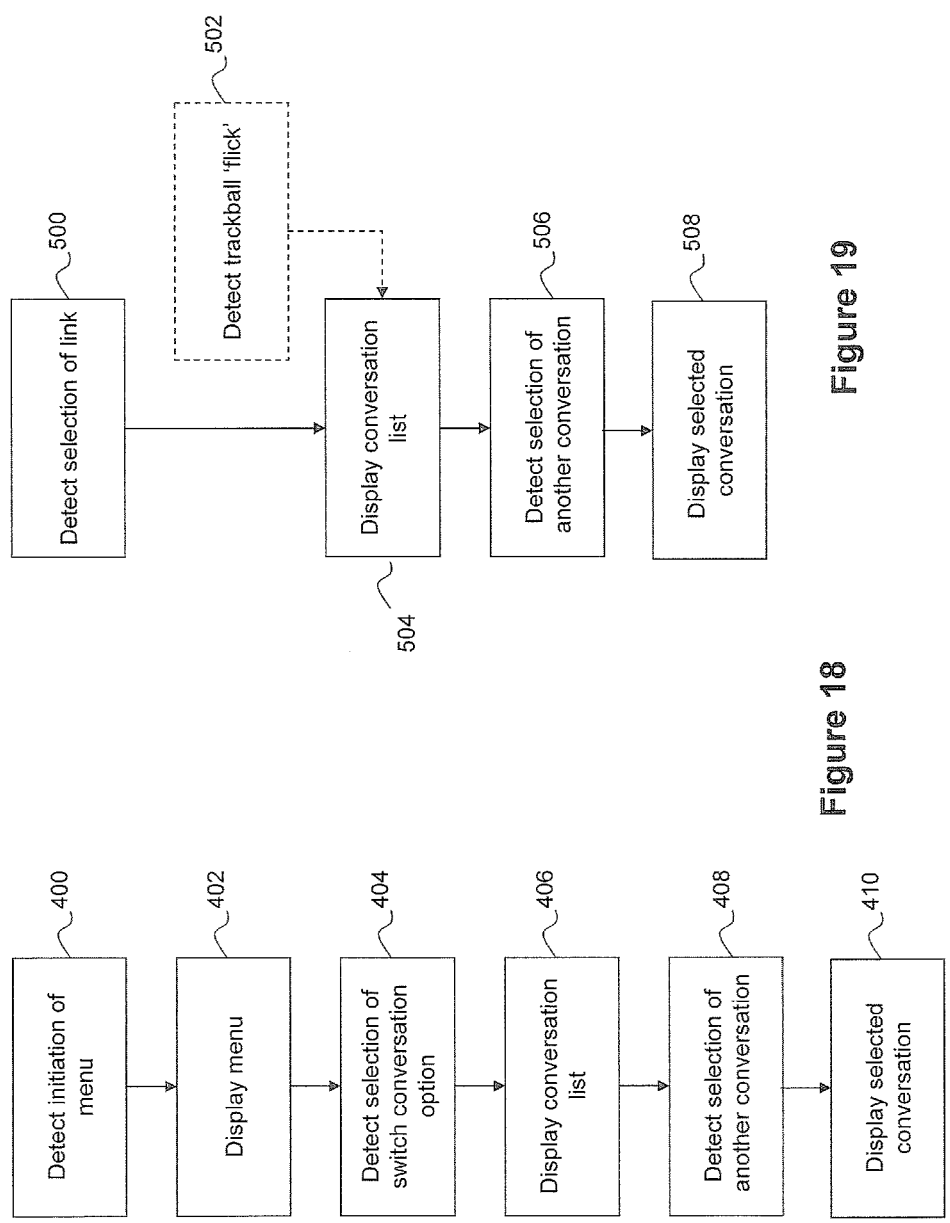
FIG. 18 is a flow diagram illustrating computer executable operations for enabling navigation between conversations using the Switch Conversation option shown in FIGS. 14 and 15.
FIG. 19 is a flow diagram illustrating computer executable operations for enabling navigation between conversations using either of the links shown in FIG. 17.

FIG. 18 illustrates a set of computer executable instructions that may be employed to populate and display the conversation list 290 by providing the Conversation Switch option 272 in the condensed menu 270 according to the example shown in FIGS. 14 to 16. When a conversation screen 242 is open, the conversation switcher module 264 in the IM application 54 first detects the initiation of the condensed menu 270 at 400. Upon receiving a first input for initiating the condensed menu 270, e.g. by detecting depression of the trackball 14*a*, 14*b*, the condensed menu 270 is displayed at 402 and is populated to include the Switch Conversation option 272 as shown in FIG. 14. While the condensed menu 270 is being displayed in the conversation screen 242, the conversation switcher module 264 may then look for and detect a second input selecting the Switch Conversation option 272 at 404, e.g. by detecting a second depression of the trackball 14*a*, 14*b* or selection of a menu or option button 24. Upon detecting the second input at 404, the conversation switcher module 264 would obtain the read/unread status of the conversations and the time at which the last activity occurred by accessing the necessary information from the IM message store 61 and IM contact list store 63 and instruct the IM GUI module 266 to display the conversation list 290 at 406. While the conversation list 290 is being displayed, the IM GUI module 266 would allow the user to scroll through the conversation list 290 and highlight a desired conversation 292. The IM GUI module 266 would then look for and detect a third input selecting one of the conversation listings 292 at 408, which would then be communicated to the conversation switcher module 264 for accessing the selected conversation from the IM message store 61 and provide the associated data to the IM GUI module 266 for displaying the selected conversation at 410. Referring to the example shown in FIGS. 14 to 16, the operations performed in FIG. 18 would enable navigation from the conversation with User D to the conversation with User C to read the unread message 302. A similar sequence of operations may then be performed to navigate to yet another conversation or to navigate back to the conversation with User D.

FIG. 19 illustrates a set of computer executable instructions that may be employed to enable navigation to another conversation using one of the links shown in FIG. 17. While in the conversation screen 242, e.g. as shown in FIG. 17, the conversation switcher module 264 looks for and detects either the selection of the hyperlink style switch link 304, e.g. by detecting a touch event at or near the X-Y position of the switch link 304; or a trackball flick or scroll accompanied by selection of the switch button 306 at 502 (e.g. towards and then highlighting the switch button 306 and subsequent selection). Regardless of which input mechanism and link are used, the conversation switcher module 264, similar to the above example, would obtain the read/unread status of the conversations and the time at which the last activity occurred by accessing the necessary information from the IM message store 61 and IM contact list store 63 and instruct the IM GUI module 266 to instead immediately display the list of conversations 290 at 504, i.e. without first loading and displaying a menu. While the list of conversations 290 is being displayed, the IM GUI module 266 would allow the user to scroll through the conversation listings 292 and highlight a desired conversation listing 292, e.g. by highlighting the desired conversation using the selection bar 294. The IM GUI module 266 would then look for and detect another input selecting one of the conversations 292 at 506, which would then be communicated to the conversation switcher module 264 to access the selected conversation from the IM message store 61 and provide the associated data to the IM GUI module 266 for displaying the selected conversation 292 at 508. In this example, it can be appreciated that use of the condensed menu 270 is avoided and the list of conversations 290 can be displayed immediately in the conversation screen 242 by simply selecting the link which is provided directly within the conversation screen 242.

It will be appreciated that the principles described herein may be applied to only conversations associated with the same IM protocol 64 or may be applied to all conversations across multiple IM platforms. The conversation switcher module 264 is therefore capable of accessing data for multiple IM protocols and arranging the conversation list 290 to include any conversation, regardless of the IM platform in which it exists. This can be accomplished by providing the conversation switcher module 264 with access to IM message stores 61 and IM contact lists 63 associated with all IM protocols 64 available to and used by the mobile device 100.

As shown herein, to avoid inconveniences associated with closing a conversation and opening another conversation from a contacts screen in order to navigate between such conversations, the IM application 54 can be configured to display a list of conversations 290 upon detecting selection of a menu item 272 or link 304, 306 within the conversation screen 242 and permit navigation to another conversation.

The conversations may be prioritized based first on whether the conversation has any unread messages and within the grouping of those conversations having unread messages, may be prioritized based on when the last activity occurred. In this way, the user has easiest and most immediate access to conversations with the most recent activity with the ability to scroll down the list of conversations 290 to continue a relatively "older" conversation if desired. This can be particularly advantageous upon detecting that a new conversation has arrived, e.g. upon observing a new incoming message. The user may then simply initiate display of the list of conversations 290, and at the top of the list is the most recently received, unread message. This enables quick navigation into and out of various conversations facilitating participation in these various conversations, in particular to keep up with a conversation as new activity occurs.

It will be appreciated that the particular options, outcomes, applications, screen shots and icons shown in the figures and described above are for illustrative purposes only and many other variations can be used according to the principles described.

Although the above has been described with reference to certain specific embodiments, various modifications thereof will be apparent to those skilled in the art as outlined in the appended claims.

The invention claimed is:

1. A method for switching between conversations in an instant messaging application, the method comprising:
   providing a first option for switching between conversations in said instant messaging application, wherein said first option is provided as a first selectable icon upon immediate display of said first conversation screen, and is further provided independent of a current context of conversations associated with said instant messaging application;
   upon detecting a selection of said first option while displaying said first conversation screen, displaying a first list of other conversations within said first conversation screen without navigating away from said first conversation screen, said first list of conversations comprising a first plurality of other conversations ordered by listing a first group of at least one conversation having an unread message above a second group of conversations without unread messages, wherein each conversation in the first list of conversations is separate and distinct from a set of messages comprised therein;
   upon detecting selection of a desired one of said first plurality of other conversations, navigating away from said first conversation screen and displaying a second conversation screen for said desired one of said first plurality of other conversations;
   providing a second option for switching between conversations in said instant messaging application, wherein said second option is provided as a second selectable icon upon immediate display of said second conversation screen, and is further provided independent of a current context of conversations associated with said instant messaging application,
   wherein said first selectable icon and said second selectable icon are provided separate and distinct from a portion of said instant messaging application configured to present at least status information of one or more users associated with at least one conversation in said instant messaging application, and wherein functionality said first option and said second option remains constant while being provided in said instant messaging application;
   upon detecting a selection of said second option while displaying said second conversation screen, displaying a second list of conversations within said second conversation screen without navigating away from said second conversation screen, said second list of conversations comprising said first conversation; and
   upon detecting selection of said first conversation from said second list of conversations, navigating away from said second conversation screen and displaying said first conversation screen.

2. The method according to claim 1, said first group of conversations being ordered based on a time at which a most recent message was sent or received, and said second group of conversations being separately ordered based on time.

3. The method according to claim 1, said first and second groups of conversations being ordered based on a time at which a most recent message was sent or received.

4. The method according to claim 1, wherein said selection of at least one of said first option and said second option comprises receiving an input via a touch event or detecting movement of a trackball towards said at least one of said first option and said second option.

5. A non-transitory computer readable medium comprising computer executable instructions for switching between conversations in an instant messaging application, said computer executable instructions comprising instructions for:
   providing a first option for switching between conversations in said instant messaging application, wherein said first option is provided as a selectable icon upon immediate display of said first conversation screen, and is further provided independent of a current context conversations associated with said instant messaging application;
   upon detecting a selection of said option while displaying said first conversation screen, displaying a first list of other conversations within said first conversation screen without navigating away from said first conversation screen, said first list of conversations comprising a first plurality of other conversations ordered by listing a first group of at least one conversation having an unread message above a second group of conversations without unread messages, wherein each conversation in the first list of conversations is separate and distinct from a set of messages comprised therein;
   upon detecting selection of a desired one of said first plurality of other conversations, navigating away from said first conversation screen and displaying a second conversation screen for said desired one of said first plurality of other conversations;
   providing a second option for switching between conversations in said instant messaging application, wherein said second option is provided as a selectable icon upon immediate display of said second conversation screen, and is further provided independent of a current context of conversations associated with said instant messaging application,
   wherein said first selectable icon and said second selectable icon are provided separate and distinct from a portion of said instant messaging application configured to present at least status information of one or more users associated with at least one conversation in said instant messaging application, and wherein functionality said first option and said second option remains constant while being provided in said instant messaging application;
   upon detecting a selection of said second option while displaying said second conversation screen, displaying a second list of conversations within said second conversation screen without navigating away from said second conversation screen, said second list of conversations comprising said first conversation; and
   upon detecting selection of said first conversation from said second list of conversations, navigating away from said second conversation screen and displaying said first conversation screen.

6. The computer readable medium according to claim 5, said first group of conversations being ordered based on a time at which a most recent message was sent or received, and said second group of conversations being separately ordered based on time.

7. The computer readable medium according to claim 5, said first and second groups of conversations being ordered based on a time at which a most recent message was sent or received.

8. The computer readable medium according to claim 5, wherein said selection of at least one of said first option and said second option comprises receiving an input via a touch event or detecting movement of a trackball towards said at least one of said first option and said second option.

9. A mobile device comprising a display, a processor, one or more input mechanisms and a computer readable medium comprising computer executable instructions for switching between conversations in an instant messaging application, said computer executable instructions comprising instructions for:
   providing a first option for switching between conversations in said instant messaging application, wherein said first option is provided as a selectable icon upon immediate display of said first conversation screen, and is further provided independent of a current context of conversations associated with said instant messaging application;
   upon detecting a selection of said first option while displaying said first conversation screen, displaying a first list of other conversations within said first conversation screen without navigating away from said first conversation screen, said first list of conversations comprising a first plurality of other conversations ordered by listing a first group of at least one conversation having an unread message above a second group of conversations without unread messages, wherein each conversation in the first list of conversations is separate and distinct from a set of messages comprised therein;
   upon detecting selection of a desired one of said first plurality of other conversations, navigating away from said first conversation screen and displaying a second conversation screen for said desired one of said first plurality of other conversations;
   providing a second option for switching between conversations in said instant messaging application, wherein said second option is provided as a selectable icon upon immediate display of said second conversation screen, and is further provided independent of a current context of conversations associated with said instant messaging application,
   wherein said first selectable icon and said second selectable icon are provided separate and distinct from a portion of said instant messaging application configured to present at least status information of one or more users associated with at least one conversation in said instant messaging application, and wherein functionality said first option and said second option remains constant while being provided in said instant messaging application;
   upon detecting a selection of said second option while displaying said second conversation screen, displaying a second list of conversations within said second conversation screen without navigating away from said second conversation screen, said second list of conversations comprising said first conversation; and
   upon detecting selection of said first conversation from said second list of conversations, navigating away from said second conversation screen and displaying said first conversation screen.

10. The mobile device according to claim 9, said first group of conversations being ordered based on a time at which a most recent message was sent or received, and said second group of conversations being separately ordered based on time.

11. The mobile device according to claim 9, said first and second groups of conversations being ordered based on a time at which a most recent message was sent or received.

12. The mobile device according to claim 9, wherein said selection of at least one of said first option and said second option comprises receiving an input via a touch event or detecting movement of a trackball towards said at least one of said first option and said second option.

\* \* \* \* \*